United States Patent
Yano et al.

(10) Patent No.: US 6,901,502 B2
(45) Date of Patent: May 31, 2005

(54) INTEGRATED CIRCUIT WITH CPU AND FPGA FOR RESERVED INSTRUCTIONS EXECUTION WITH CONFIGURATION DIAGNOSIS

(75) Inventors: Junichi Yano, Osaka (JP); Hisato Yoshida, Nara (JP); Kimihiko Aiba, Osaka (JP); Katsuyuki Imamura, Osaka (JP); Junichi Mori, Osaka (JP); Junya Yamamoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/001,967

(22) Filed: Dec. 5, 2001

(65) Prior Publication Data

US 2002/0133690 A1 Sep. 19, 2002

(30) Foreign Application Priority Data

Dec. 6, 2000 (JP) .................................... 2000-371299

(51) Int. Cl.[7] .............................................. G06F 9/44
(52) U.S. Cl. ............................ 712/37; 326/39; 712/34; 713/100
(58) Field of Search ............................. 326/39; 712/34, 712/37; 713/100, 1

(56) References Cited

U.S. PATENT DOCUMENTS

| | | | | |
|---|---|---|---|---|
| 5,361,373 A | * | 11/1994 | Gilson | ........................... 712/1 |
| 5,748,979 A | * | 5/1998 | Trimberger | ................... 712/37 |
| 5,996,004 A | | 11/1999 | White | |
| 6,067,615 A | | 5/2000 | Upton | |
| 6,134,707 A | | 10/2000 | Herrmann et al. | |
| 2003/0140222 A1 | * | 7/2003 | Ohmi et al. | ................... 713/1 |

FOREIGN PATENT DOCUMENTS

| | | |
|---|---|---|
| JP | 03-083136 | 4/1991 |
| JP | 5-242050 | 9/1993 |
| JP | 07-175631 | 7/1995 |
| JP | 2000-235489 A | 8/2000 |
| WO | WO 00/49496 | 8/2000 |

* cited by examiner

Primary Examiner—Kenneth S. Kim
(74) Attorney, Agent, or Firm—McDermott Will & Emery LLP

(57) ABSTRACT

A semiconductor integrated circuits can send and receive signals to and form a configuration memory. The semiconductor integrated circuits is provided therein wiht an instruction memory, an instruction storage portion that stores reserved instructions as F instructions, and stores the substantially equivalent processing contents to the F instructions as substitute instructions for processing by the CPU, a pre-fetch portion, a history storage portion, a diagnosing portion for diagnosing the types of instructions, a reprogramming control portion for reprogramming the instructions, a CPU, an FPGA, a configuration data memory, a built-in memory, and a configuration data tag. When the configuration data of the F instruction does not exist in the FPGA, the substantially equivalent processing by FPGA is executed by the CPU by making use of the substitute instructions.

24 Claims, 9 Drawing Sheets

FIG. 4

| Instructions | | Comment |
|---|---|---|
| ADD | D1, D2 | #D1+D2→D2 |
| LSR | D3, D2 | #D2 (D3)bit shift-right→D2 |

FIG. 5

| Bank0 ID=1 | Bank1 ID=1 | Bank2 ID=4 | Bank3 ID=4 | Bank4 ID=4 | Bank5 ID=0 | Bank6 ID=0 | Bank7 ID=0 |
|---|---|---|---|---|---|---|---|

FIG. 6A

FPGA 1 D1, D2, D3    #D1+D2 (D3)bit shift-right→D2

FIG. 6B

ADD   D1, D2    #D1+D2→D2

LSR   D3, D2    #D2 (D3)bit shift-right→D2

FPGAend         # Termination of substitute instruction

FIG. 7

Both F instruction and substitute instruction are described.

FPGA 0 D1, D2, D3(addr) #D1+D2 (D3)bit shift-right→D2
                         #In case F instruction is
                          executed, skip to (addr)

ADD   D1, D2 #D1+D2→D2    Substitute instruction
                          from here LSR   D3, D2 #D2 (D3)bit shift-right→D2 Substitute
                                        instruction up to
                                        this point (Next instruction) # This is the address shown
                     by (addr)

FIG. 8

ADD  D1, D2     #D1+D2→D2

LSR  D3, D2     #D2 (D3)bit shift-right→D2

FIG. 9

| ID | Instructions | Corresponding Configuration Data | Number of Banks |
|----|--------------|----------------------------------|-----------------|
|    |              |                                  |                 |

FIG. 10

| 1 | ADD D1, D2<br>LSR D3, D2 | Corresponding Configuration Data | 1 |
|---|--------------------------|----------------------------------|---|

INTEGRATED CIRCUIT WITH CPU AND FPGA FOR RESERVED INSTRUCTIONS EXECUTION WITH CONFIGURATION DIAGNOSIS

BACKGROUND OF THE INVENTION

This invention relates to a semiconductor integrated circuit that has a CPU and an embedded programmable device, and in particular, it relates to measures for improvement in processing ability.

Programmable devices referred to as PLD (Programmable Logic Device) or FPGA (Field Programmable Gate Array) are widely known (hereinafter referred to as FPGA in this specification). FPGA is a device that enables the user to program its circuit configuration, and has a merit in which the circuit designed by the user is composed immediately to realize the operation. Especially in case of FPGA where circuit configuration is repeatedly recomposed, it also has a merit of improving the processing ability by flexibly changing the necessary circuit configuration on each occasion.

Furthermore, in recent years, it has been proposed to embed the FPGA and CPU into a single semiconductor integrated circuit. In such a semiconductor integrated circuit, in addition to the changes in the program of the conventional CPU, since it has become possible to change the circuit configuration of FPGA, it becomes possible to respond more flexibly to changes of the system.

As an example of conventional semiconductor integrated circuits that has a CPU and an embedded FPGA, there is the one disclosed in Japanese Patent Laid-Open Publication No. Hei. 5-242050. The disclosed circuit has a CPU and an embedded FPGA, and a method in which a part of the operation to be processed is executed by the circuit composed in the FPGA is also disclosed.

However; in the above-mentioned conventional semiconductor integrated circuit that has a CPU and an embedded FPGA, there is a problem in which, in a case where instruction to be processed by FPGA is provided, if a circuit for executing such a processing is not composed in the FPGA, it is handled as undefined operation and the process is suspended.

In addition, in the above-mentioned conventional semiconductor integrated circuit that has a CPU and an embedded FPGA, in a case where the circuit composed in the FPGA is fixed, it does not take advantage of the FPGA characteristics in which the circuit configuration is changed dynamically and it cannot respond flexibly to the necessary circuits on each occasion. Thus, there were limits to the processing ability improvement.

Furthermore, if the circuits composed in the FPGA are changed dynamically, it is necessary for users to designate the timing of circuit configuration change beforehand, and changes in circuit configuration cannot be executed automatically. Moreover, when different users execute different processing on the same semiconductor integrated circuit, it is necessary to designate circuit configuration of the FPGA and the timing of circuit configuration change.

In other words, in a case of conventional semiconductor integrated circuits that has a CPU and an embedded FPGA, there is a problem in which processing ability improvement based on FPGA is not able to be executed automatically.

SUMMARY OF THE INVENTION

An object of the present invention is to provide a semiconductor integrated circuit that has a CPU and an embedded FPGA, which has a high processing ability and can automatically and dynamically change circuits composed in the FPGA.

A semiconductor integrated circuit according to the present invention comprises a CPU, an auxiliary operational device for the CPU composed of a programmable device that can reprogram circuit configuration thereof, first diagnosing means for receiving one or more instructions and diagnosing whether the one or more instructions are a reserved instruction that can be processed by the auxiliary operational device or not, and a configuration controller for programming circuit configuration data for executing processing of the reserved instruction into the auxiliary operational device.

As a result, the circuit composed by an embedded programmable device can be dynamically and automatically changed, and it becomes possible to provide a semiconductor integrated circuit that has a CPU and an embedded programmable device and has a high processing ability.

It is preferable that the circuit further comprises second diagnosing means and third diagnosing means. The second diagnosing means is used for diagnosing, upon receipt of the result of the aforementioned first diagnosing means, whether the circuit for executing the processing of the aforementioned reserved instruction exists in the above-mentioned auxiliary operational device or not in a case where the above-mentioned one or more instructions is the above-mentioned reserved instruction. The third diagnosing means is used for diagnosing, upon receipt of the diagnosis results of the aforementioned first diagnosing means and/or second diagnosing means, whether the processing of the reserved instruction is executed by using the above-mentioned auxiliary operational device or not in a case where the one or more instructions is the reserved instruction.

It is preferable that the circuit further comprises instruction changeover means for instructing to execute, upon receipt of the diagnosis results of the aforementioned second diagnosing means, the processing of the reserved instruction by the auxiliary operational device in a case where the circuit for executing the processing of the reserved instruction exists in the auxiliary operational device, and for instructing to execute the processing of the reserved instruction by the CPU in a case where no circuit for executing the processing of the reserved instruction exists in the auxiliary operational device. As a result, even when the configuration data of the reserved instruction does not exist in the programmable device, a case in which the CPU is suspended by handling the instruction as undefined operation will not occur.

The above-mentioned reserved instruction may be an instruction that cannot be executed by the CPU, and the semiconductor integrated circuit may further comprise substitute instruction supplying means for supplying a substitute instruction in order to execute a substantially equivalent processing to the aforementioned reserved instruction by the CPU. In this constitution, the above-mentioned instruction changeover means may have a function for fetching the aforementioned substitute instruction from the above-mentioned substitute instruction supplying means. As a result, when no circuit for processing the reserved instruction in the auxiliary operational device, it is possible to execute the substantially equivalent processing to that of the processing based on the reserved instruction with the CPU by sending the substitute instruction. Therefore, even when there is no configuration data of the reserved instruction in the programmable device, a case in which the CPU is suspended by handling the instruction as undefined operation will not occur.

The above-mentioned reserved instruction may be an instruction that cannot be executed by the CPU, and the semiconductor integrated circuit may further comprise instruction supplying means having a function for supplying the one or more instructions and a substitute instruction for executing a substantially equivalent processing to the reserved instruction by the CPU. In this constitution, the above-mentioned instruction changeover means may have a function for selecting and obtaining the aforementioned reserved instruction or the above-mentioned substitute instruction from the above-mentioned instruction supplying means. As a result, the circuit can execute the above-mentioned reserved instruction or the above-mentioned substitute instruction quickly.

It is preferable that the above-mentioned reserved instruction is an instruction that can be executed by the CPU, the above-mentioned instruction changeover means has a function for changing the above-mentioned instruction so that the processing of the aforementioned reserved instruction is executed by the above-mentioned auxiliary operational device in a case where the processing of the above-mentioned reserved instruction is executed by the aforementioned auxiliary operational device, and for not changing the above-mentioned reserved instruction in a case where the processing of the aforementioned reserved instruction is executed by the above-mentioned CPU.

The configuration controller may have a function for programming, upon receipt of the reserved instruction, circuit configuration data of the above-mentioned reserved instruction in the auxiliary operation device in a case where no circuit for executing the processing of the reserved instruction exists in the auxiliary operation device. As a result, even when the program is changed, it is possible to utilize the programmable device corresponding to the change. Therefore, the improvement of processing efficiency can be aimed at by dynamic reprogramming such as HW/SW changeover that utilizes programmable device.

The semiconductor integrated circuit may further comprise history storage means for storing usage frequency of the aforementioned reserved instruction, and the above-mentioned configuration controller may program, while referring to the above-mentioned history storage means, circuit configuration data for processing the reserved instruction with higher usage frequency into the aforementioned auxiliary operational device with priority. As a result, it is possible to optimize the usage of the programmable device that utilizes the frequency as the index.

It is preferable that the semiconductor integrated circuit further has a memory, and the aforementioned configuration controller programs, while referring to the above-mentioned history storage means, the circuit configuration data of the aforementioned reserved instruction into the above-mentioned auxiliary operational device and the memory in the order of high usage frequency.

It is preferable that the semiconductor integrated circuit further has a memory, and the aforementioned configuration controller further comprises fourth diagnosing means for programming, while referring to the aforementioned history storage means, the circuit configuration data of the above-mentioned reserved instruction into the aforementioned auxiliary operational device if an idle capacity is larger than the circuit configuration data of the above-mentioned reserved instruction, and for releasing, if the idle capacity is smaller than the aforementioned data of the reserved instruction, the configuration data of a reserved instruction having a lower usage frequency than that of the reserved instruction from the aforementioned auxiliary operational device until the idle capacity becomes larger than the circuit configuration data of the above-mentioned reserved instruction, and for programming the configuration data of the aforementioned released reserved instruction into the above-mentioned memory.

The semiconductor integrated circuit may further comprise history storage means for storing a transition pattern of the reserved instruction when the one or more instructions includes a plurality of reserved instructions, and the above-mentioned configuration controller may program, while referring to the above-mentioned history storage means, the circuit configuration data of the reserved instruction having a higher probability of transition from the reserved instruction being received at present into the aforementioned auxiliary operational device with priority. As a result, it is possible to provide a circuit that is especially suitable for devices of the types indicating specific transition patterns.

In such a case, it is preferable that the semiconductor integrated circuit further comprises history storage means for storing for each reserved instruction a frequency of a second reserved instruction executed next to a first reserved instruction when the one or more instructions includes a plurality of reserved instructions, and the aforementioned configuration controller programs, while referring to the above-mentioned history storage means, the circuit configuration data of the second reserved instruction having a high frequency of being executed next to the first reserved instruction being received at present into the above-mentioned auxiliary operational device with priority.

In addition, the semiconductor integrated circuit may further has history storage means for storing a transition pattern of the reserved instruction in a case where the aforementioned reserved instruction is received two times, and a time interval at which the above two reserved instructions are received, and the above-mentioned configuration controller may program, while referring to the above mentioned history storage means, the circuit configuration data of the reserved instruction having a higher transition probability from a reserved instruction being received at present into the above-mentioned auxiliary operational device only when the above-mentioned time interval is longer than a time required for programming the circuit configuration data. As a result, it is possible to improve the processing ability.

The semiconductor integrated circuit may further comprises history storage means for storing a transition pattern of the reserved instruction in a case where the aforementioned reserved instruction is received two times, and a time interval at which the above-mentioned two reserved instructions are received, and the above-mentioned configuration controller may program, while referring to the history storage means, the circuit configuration data of a second reserved instruction having a high frequency of being executed next to a first reserved instruction being currently received into the aforementioned auxiliary operational device only when the above-mentioned time interval is longer than a time required for programming the circuit configuration data. As a result, the improvement of the processing ability can also be achieved.

The aforementioned configuration controller may program the configuration data of the above-mentioned reserved instruction if an idle capacity of the above-mentioned auxiliary operational device is larger than the capacity of the configuration data of the above-mentioned reserved instruction, and release, if the idle capacity is smaller than the capacity of the configuration data of the above-mentioned reserved instruction, a reserved instruction having lower usage frequency than the above-mentioned reserved instruction from the above-mentioned auxiliary operational device until the idle capacity becomes larger than the capacity of circuit configuration data of the aforementioned reserved instruction. Thereby, the improvement of processing ability can be achieved.

The aforementioned auxiliary operational device may have a plurality of banks, and the above-mentioned configuration controller may program the configuration data of the above-mentioned reserved instruction if a vacant bank of the above-mentioned auxiliary operational device is larger than a necessary bank of the configuration data of the above-mentioned reserved instruction, and release, if the vacant bank is smaller than a necessary bank of the configuration data of the above-mentioned reserved instruction, a reserved instruction having a lower usage frequency than the above-mentioned reserved instruction from the aforementioned auxiliary operational device until the vacant bank becomes larger than the necessary bank of the circuit configuration data of the above-mentioned reserved instruction. As a result, it is surely possible to improve the processing ability.

BRIEF DESCRIPTION OF THE DRAWINGS

FIG. 4 is a drawing showing an example of a program used in the first embodiment.

FIG. 5 is a drawing showing a data structure of a configuration data tag in a case where the number of banks is 8, and the number of configuration data is 4 in the first embodiment.

FIGS. 6A and 6B are drawings showing concrete examples of F instructions and substitute instructions in the first embodiment in the respective order.

FIG. 7 is a drawing showing a concrete example in a case where F instructions and substitute instructions are shown together in a program in a second embodiment.

FIG. 8 is a drawing showing an example of instructions provided from an instruction memory in a third embodiment.

FIG. 9 is a drawing showing a data structure of a configuration memory in the third embodiment.

FIG. 10 is a drawing showing an example of the data structure of configuration memory relative to an example of a plurarity of instructions shown in FIG. 8.

Figure 1:
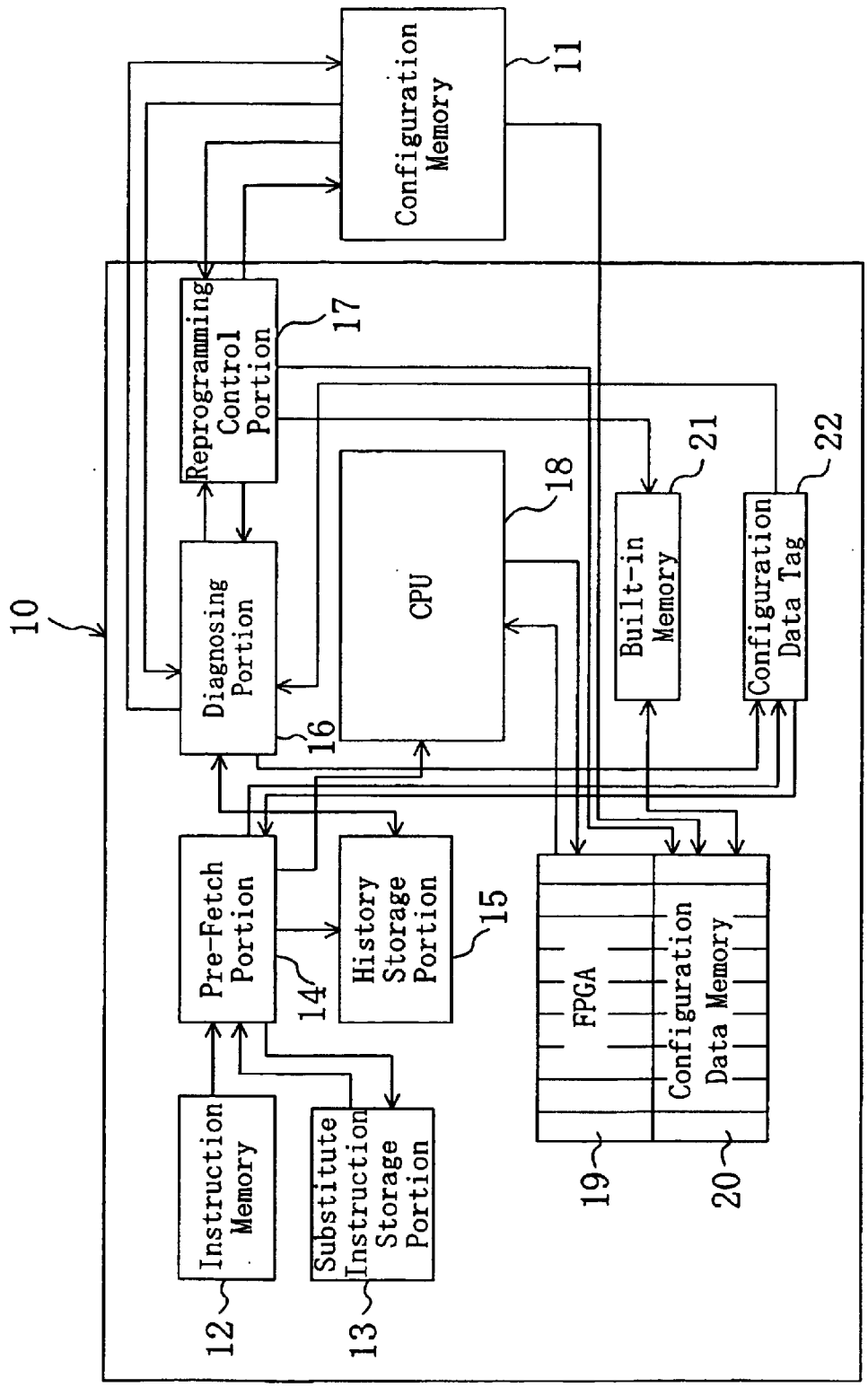
FIG. 1 is a block circuit diagram of a semiconductor integrated circuit according to a first embodiment of the present invention.

DETAILED DESCRIPTION OF THE INVENTION (First Embodiment)
Outline of Configuration of System FIG. 1 is a block circuit diagram of a semiconductor integrated circuit according to a first embodiment of the present invention. As shown in the drawing, the semiconductor integrated circuit 10 of the present embodiment can send and receive signals with a configuration memory 11 provided outside. Furthermore, the semiconductor integrated circuit 10 is provided therein with an instruction memory 12 that stores the program for processing data, etc., a substitute instruction storage portion 13 that stores substitution instruction for executing by the CPU 18 a substantially equivalent processing to a reserved instruction (hereinafter referred to as the "F instruction") processed in the FPGA 19, a pre-fetch portion 14 for fetching instructions from the instruction memory 12 and the substitute instruction storage portion 13, a history storage portion 15 for storing the history of F instruction input from the instruction memory 12, a diagnosing portion 16 that diagnoses the circuit composed in the embedded FPGA 19 upon receipt of output of the history storage portion 15, a reprogramming control portion 17 for reprogramming the circuit composed in the embedded FPGA 19 upon receipt of output of the diagnosing portion 16, the CPU 18 that operates in accordance with the instructions provided for the pre-fetch portion 14, the embedded FPGA 19, a built-in memory 21, and a configuration data tag 22. In the embedded FPGA 19, a configuration data memory 20 for storing the configuration data of the circuit composed in the embedded FPGA 19 is included. The instructions are composed of basic instructions in which data processing is completed in the CPU 18, and extension instruction that executes data processing by circuits outside of the CPU 18. The F instruction corresponds to the extended instruction and the substitute instruction corresponds to the basic instruction.

Furthermore, although it is not illustrated, in the semiconductor integrated circuit 10, there may be logic circuits or analog circuits other than the CPU 18 or the embedded FPGA 19, and various processing will be executed by them. In case of such processing, similar controls to the conventional method can be applied.

Configuration of Memory Portion

First of all, an explanation will be given on the configuration of the memory portion such as instruction memory 12, substitute instruction storage portion 13, embedded FPGA 19, configuration data tag 22, configuration memory 11, and history storage portion 15.

In the instruction memory 12, program to be executed by the CPU 18 is stored. F instruction may be included in this program. ID code is given to the F instruction in order to distinguish each F instruction. In the substitute instruction storage portion 13, substitute instructions for executing the equivalent processing to respective F instructions by the CPU 18 are stored.

FIG. 4 is a drawing showing an example of a program stored in the instruction memory 12. "ADD, D1, D2" that are on the left side of the symbol # are instructions stored in the instruction memory, and the contents given on the right side of the symbol # are comments that explain the operations of the instructions, and they are not stored in the instruction memory. In this example, three registers D1, D2, and D3 exist. The instruction of the first row is an instruction in which D1 and D2 are added and the added result is substituted into D2. The instruction of the second row is an instruction for shifting the data of D2 to the right by the value of D3 and substituting this in D2.

The configuration data tag 22 is composed of registers (or memories) whose number is the same as the number of the FPGA banks, and the ID codes of the configuration data are stored in the respective registers (or memories).

FIG. 5 is a drawing that shows the data structure of the configuration data tag 22 in a case where the number of banks is 8 (bank 0 to bank 7), and the number of configuration data is 4 (ID=1 to 4). Wherein, in the drawing, ID=0 means that nothing is contained. As shown in the drawing, in this example, configuration data of the F instruction of ID1 is contained in banks 0 to 1. In banks 2 to 4, the configuration data of F instruction of ID4 is contained, and no configuration data is contained in banks 5 to 7. The configuration data tag 22 has a mechanism for replying to inquiry such as "Are there any configuration data specified by a certain ID?" from the pre-fetch portion 14 or the like. For instance, in the case of inquiry such as "Is there configuration data of ID=4?," it will reply "It is in banks 2 to 4." Furthermore, even for inquiries such as "Are there any vacancies?" it has a mechanism for reply. In the case shown in FIG. 5, it will reply "Banks 5 to 7 are vacant" in reply to the aforementioned inquiry.

FIGS. 6A and 6B are drawings showing examples of F instruction among programs stored in the substitute instruction storage portion 13 and the instruction memory 12, respectively. In the example shown in FIG. 6B, after the character string, "FPGA", that indicates that it is an F instruction, 1 that is an ID code, and three registers D1, D2, and D3 that are used for this instruction are designated. The processing executed by this F instruction is the same as the program shown in FIG. 4 in this case.

In the example of FIG. 6B, an example of substitute instruction against F instruction of FIG. 6A is shown. In other words, in the CPU 18, the same program that executes a substantially equivalent processing to the F instruction shown in FIG. 6A is stored.

In other words, in the substitute instruction storage portion 13, in a case where the F instruction is processed by the CPU 18 instead of the embedded FPGA 19, the substitute instruction for realizing the substantially equivalent processing to F instruction is stored. That is, the substitute instruction referred to here is a basic instruction for executing the equivalent processing by the CPU 18 even when extension instruction for processing by the embedded FPGA 19 is provided in a case where circuit to execute the processing is not composed in the embedded FPGA 19.

In a case where the F instruction is fetched by the pre-fetch portion 14 and the substitute instruction is to be executed, the pre-fetch portion 14 accesses to the substitute instruction storage portion 13 to fetch substitute instruction that will be substitute of the F instruction. At this time, when the ID code of the F instruction is sent to the substitute instruction storage portion 13, the substitute instruction storage portion 13 supplies a substitute instruction corresponding to the ID code. When the termination code FPGAend is detected, the termination signal of the substitution instruction is provided to the pre-fetch portion 14. When the termination signal of the substitute instruction is received, the pre-fetch portion 14 operates so that instruction is fetched again from the instruction memory 12.

In general, the circuit configuration of the FPGA is determined by providing the circuit configuration data. The circuit configuration data is generally stored in the configuration memory that is a non-volatile memory installed outside of the chip, and the circuit configuration data is given to the FPGA from the configuration memory. Furthermore, in the FPGA, the circuit configuration data is held in the configuration data memory composed in the FPGA and the logic operation of the logic module that is the minimum unit of the circuit and the connection relationship between the logic modules are determined based on the circuit configuration data, thereby the circuit configuration of the FPGA is fixed.

In this embodiment, as shown in FIG. 1, embedded FPGA 19 is divided into a plurality of banks, and the configuration data memories 20 respectively corresponding to the banks are installed. The configuration (programming of configuration data) to the configuration data memory 20 is executed in this bank unit independently of operation of the CPU 18. In addition, the CPU 18 and embedded FPGA 19 are connected through a bus so as to exchange of all data necessary for F instruction therebetween.

The history storage portion 15 counts the frequency of each F instruction, and is composed of registers whose number is the same as that of the F instruction, and counters. When the pre-fetch portion 14 detects the F instruction, the ID code of that F instruction is sent to the history storage portion 15. The history storage portion 15 adds 1 to the value of the register corresponding to the ID code that has been sent.

Processing of Pre-Fetch Portion

Figure 2:
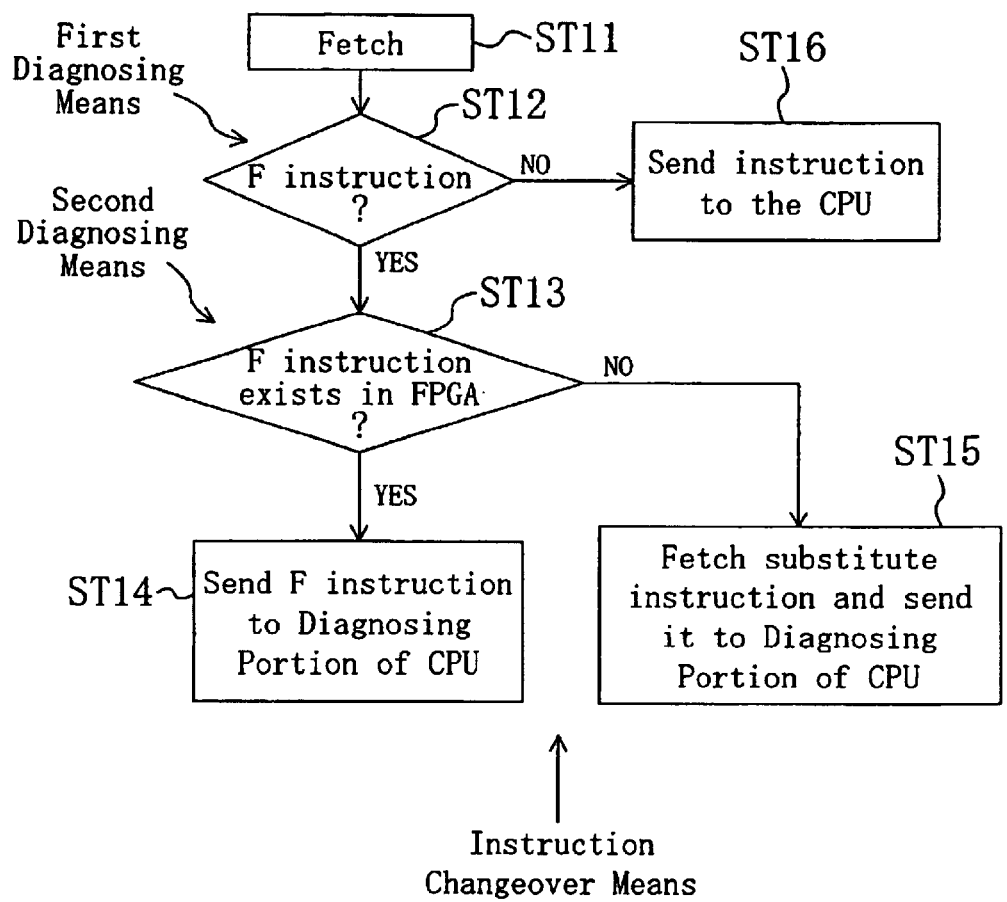
FIG. 2 is a flow chart showing the flow of the processing in a pre-fetch portion in the first embodiment.

The pre-fetch portion 14 has a function to fetch the instruction from the instruction memory 12, a function to fetch the substitute instruction from the substitute instruction storage portion 13, and a function to diagnose whether or not the fetched instructions are F instructions. FIG. 2 is a flow chart showing the flow of the processing of the pre-fetch portion 14. In other words, in Step ST11, the instructions are fetched from the instruction memory 12, and are diagnosed whether the instructions are F instructions or not in Step ST12. In a case where they are not F instructions, the instructions are sent to the CPU 18 directly in Step ST16, or in a case where they are F instructions, the routine proceeds to Step ST13 to diagnose, while referring to the contents of the configuration data tag 22, whether or not a circuit of the F instruction of the ID is composed in the embedded FPGA 19 based on the ID number of the F instruction. In case a where the circuit of F instruction of the ID is composed in the embedded FPGA 19, the routine proceeds to Step ST14 to send the F instruction directly to the CPU 18. In case a where the circuit of F instruction of the ID is not composed in the embedded FPGA 19, the routine proceeds to Step ST15 to fetch the substitute instruction from the substitute instruction storage portion 13 and to sent it to the CPU 18. Until the substitute instructions is terminated, the pre-fetch portion 14 continues to fetch the substitute instruction from the substitute instruction storage portion 13 instead of the instruction memory 12.

In this way, in a case where the circuit for executing the processing of F instruction is not composed in the embedded FPGA 19, the equivalent processing to the processing of on F instruction is executed by sending the substitute instruction to the CPU 18. In other words, even in a case where the circuit for executing the processing of F instruction is not composed in FPGA, situation in which the CPU stops by handling the F instruction as undefined operation as in the past will not occur.

Processing of Diagnosing Portion and Reprogramming Control Portion

The diagnosing portion 16 is for mainly determining the movement of configuration data among the configuration memory 11, the configuration data memory 20 inside the embedded FPGA 19, and the built-in memory 21. As inputs, there are history information from the history storage portion 15, configuration data information from the configuration data tag 22, and bank number information from the configuration memory 11. Using the information, the configuration data of which F instruction should be loaded to which bank of the configuration data memory 20 is decided. By the reprogramming control portion 17, the loading of the configuration data is controlled.

In the conventional semiconductor integrated circuit that has a CPU and an embedded FPGA, it was necessary to estimate that the configuration data of which F instruction should be loaded when and to which portion of FPGA, in order to increase the processing ability. Contrary to this, in the present embodiment, by updating the configuration data of embedded FPGA 19 in accordance with the following algorithm, it is possible to automatically diagnose configuration data of which F instruction should be loaded when and to which portion of FPGA, in order to increase the processing ability, and the updating of configuration data can be executed automatically.

Figure 3:
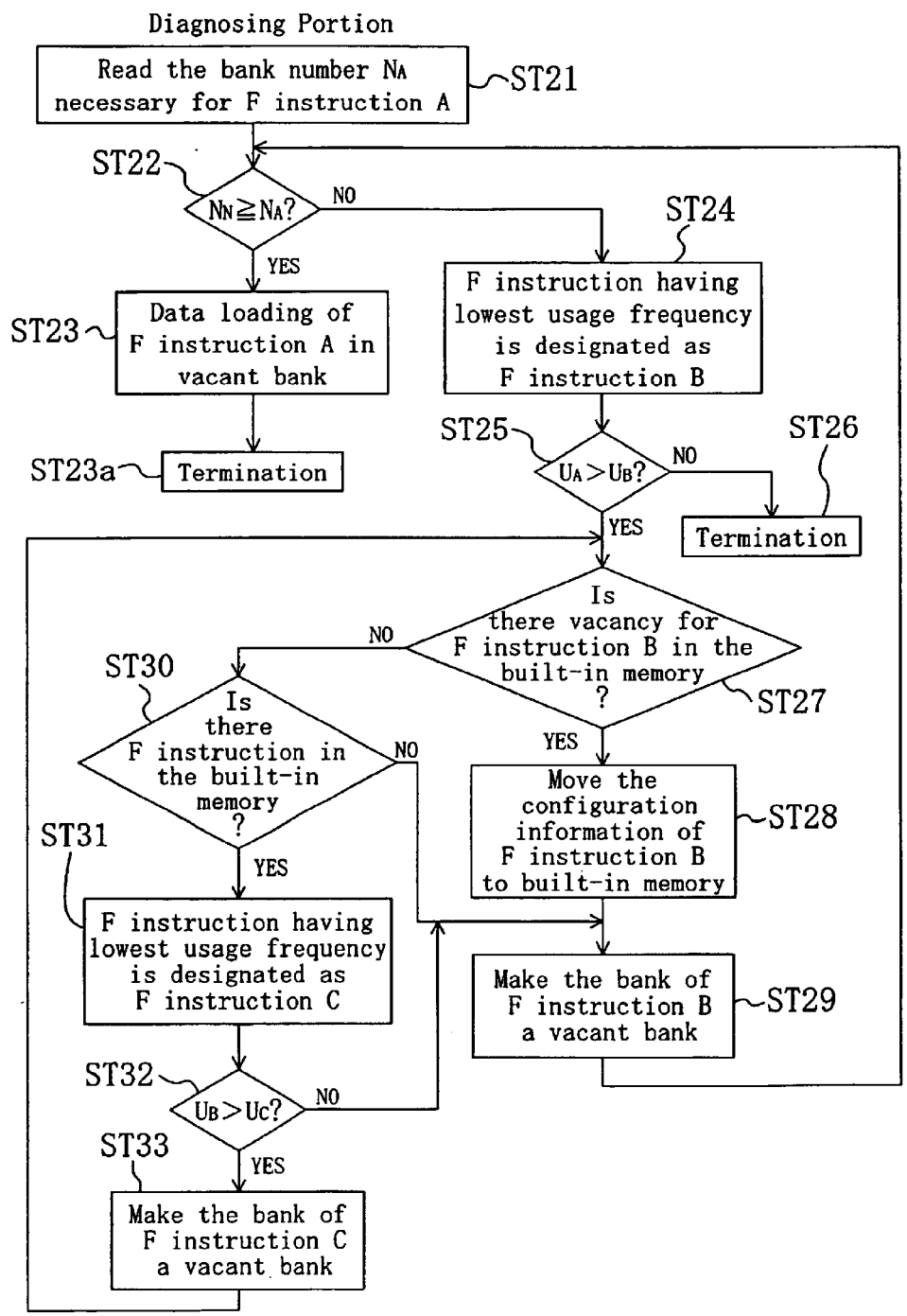
FIG. 3 is a flow chart showing the flow of the processing in a diagnosing portion and a reprogramming control portion in the first embodiment.

FIG. 3 is a flow chart that shows the flow of processing in the diagnosing portion 16 and the reprogramming control portion 17. First of all, the number of banks required for composing the F instruction is read from the configuration memory 11 in Step ST21. Next, in Step ST22 whether the number NN of vacant banks of the embedded FPGA 19 is larger than the number NA of necessary banks of F instruction A, and if NN≧NA (YES), loading of configuration data of F instruction A to the configuration data memory of the vacant bank in the embedded FPGA 19 is executed in Step ST23. At this time, if the configuration data exists in the built-in memory 21, it is therefrom and the operation is terminated.

On the other hand, in the diagnosis in Step ST22, if NN<NA (NO), among the F instructions composed in the embedded FPGA 19, processing for the substitution of F instructions having low usage frequency is performed. Subsequently, the routine proceeds to Step ST24 to select instruction having the lowest usage frequency among the F instructions composed in the embedded FPGA 19, and to designate it as F instruction B for substitution.

In Step ST25, it is diagnosed whether or not usage frequency UA of F instruction A is larger than usage frequency UB of the F instruction B, and in case of UA≦UB (NO), it is diagnosed that it should not be substituted, do nothing and terminating the operation.

On the other hand, in case of UA>UB (YES), it is checked whether there is enough space in the built-in memory 21 to store the configuration data of the F instruction B in Step ST27. In a case where there is enough space (YES) to store the configuration data of F instruction B in the built-in memory 21, F instruction B from the configuration data memory 20 in the embedded FPGA 19 is moved to the built-in memory 21 in Step ST28, and then, the bank in which the F instruction B in the configuration data memory 20 in FPGA19 is made vacant in Step ST29, and the routine returns to Step ST22. At this time, the number NN of vacant banks increases by the amount of F instruction B. Thus, the probability of the diagnosis results of Step ST22 becoming YES (NN≧NA) becomes higher. However, if NO (NN<NA), another F instruction is designated as F instruction B for substitution, and the processing of Step ST24 and thereafter are executed.

In a case of NO, namely, in a case where there is not enough space (NO) to store the configuration data of F instruction B in the built-in memory 21 in Step ST27, the processing of Step ST30 is executed, and to diagnose as to whether or not the configuration data of F instruction that is stored in the built-in memory 21 exists. If the configuration data of F instruction stored in the built-in memory 21 exists, the routine proceeds to Step ST31 so that similar processing to Steps ST24 and ST25 executed on configuration data memory 20 in embedded FPGA 19 is executed on the built-in memory 21. In other words, in Step ST31, among the F instructions stored in the built-in memory 21, the instructions having the lowest usage frequency is made F instruction C for substitution. In Step ST32, it is diagnosed whether or not the usage frequency UB of the F instruction B is larger than the usage frequency UC of the F instruction C. In a case of UB>UC, the region in which the F instruction C in the built-in memory 21 is stored is made vacant in Step ST33, and the processing of the Step ST27 is executed.

On the other hand, in a case where F instruction does not exist in the built-in memory 21 in the diagnosis of Step ST30 or, in a case where UB≦UC (NO) in Step ST32, the processing of Step ST29 is executed, the bank in which the configuration information of F instruction B has been stored is made vacant, and the processing of ST22 is executed.

As a result of the above-mentioned processing, the configuration data of F instruction is finally stored in the configuration data memory 20 and built-in memory 21 in the order of high usage frequency.

In the above processing, the F instruction B and F instruction C mean F instructions for substitution, and they do not designate any specific one of F instructions.

Furthermore, at the time of resetting, initial configuration of the configuration data of F instruction is executed to the configuration data memory 20 in embedded FPGA 19. For this initial configuration, there are a method in which configuration data of an arbitrary F instruction is loaded to the configuration data memory 20 and a method in which configuration data of F instruction having higher usage frequency is loaded to the configuration data memory 20 with priority among the history data of the history storage portion 15. In the latter method, it is necessary to take proper measures so that the information of history storage a portion 15 is not erased by resetting. Also, in a case where similar operation is necessary at the time of "power-on resetting", it is necessary that storage information of the history storage portion 15 possesses non-volatile properties.

According to the present embodiment, by using a parameter called "usage frequency U" when the configuration data of the configuration data memory 20 in the embedded FPGA 19 is determined, storage will be made to the configuration data memory 20 and built-in memory 21 from the ones having higher usage frequency in order.

Therefore, without consideration beforehand when and where the loadings of the configuration data of which F instructions are made, it is possible to change the configuration of FPGA automatically by using the usage frequency as the parameter. As a result, it becomes possible to compose higher usage frequency F instructions in the FPGA automatically, and it becomes possible to improve the processing ability.

Since there is an upper limit for the value of usage frequency U that can be stored in the history storage portion, the updated results of the frequency exceeding the upper limit may not be responded properly. Thus, when the usage frequency U of F instruction having a certain ID reaches the upper limit, it is deemed that the optimization has been completed to stop updating thereafter, or to employ a method in which the usage frequency U of all F instructions are uniformly lowered to continue updating. Thereby, F instructions of high usage frequency can be kept in the FPGA.

(Second Embodiment)

Next, an explanation is given on a second embodiment related to a control method where instruction memory having data configuration in which both F instruction and substitute instruction are described is provided. In the present embodiment, in the configuration shown in FIG. 1, not being equipped with substitute instruction storage portion 13 is the prerequisite.

FIG. 7 is a drawing that shows a concrete example of the case in which both F instruction and substitute instruction are described in the program of the instruction memory 12. In FIG. 7, a case in which F instruction shown in FIG. 6A, F instruction shown in FIG. 6B, and their substitute instructions are described, is taken up as examples.

As shown in FIG. 7, in a case where the F instructions are processed by embedded FPGA 19 upon receipt of the F instruction at the pre-fetch portion 14, the F instructions are sent to the CPU 18, an then, the pre-fetch portion will jump to the address addr described in the F instructions. Thus, substitute instructions will not be executed, and the next instruction is executed. On the other hand, in a case where the F instructions are not processed by the embedded FPGA 19 but substitute instructions are executed, the pre-fetch portion 14 neglects the F instructions and fetches the substitute instructions that are described subsequent to the F instructions, then send them to the CPU 18. Therefore, in this case, the substitute instructions will be executed by the CPU 18.

In the present embodiment, in a case where the instruction that the pre-fetch portion 14 fetches from the instruction memory 12 is the F instruction and the circuit of the F instruction is not composed in the embedded FPGA 19, the substitute instruction will be executed instead of the F instruction.

In the present embodiment, in comparison with the above-mentioned first embodiment, the changeover mechanism for switching the F instructions and the substitute instructions is unnecessary and there is the advantage of not requiring any hardware for storing the substitute instructions. However, in the first embodiment, since the F instruction and substitute instruction can be fetched in parallel, similar to the present embodiment, there is an advantage of waiting time formed at skipping or the like being short.

Even in the present embodiment, confirmation of the existence of the F instruction that utilizes the configuration data tag 22, and control of the loading of configuration data of F instruction that utilizes the diagnosing portion 16 and reprogramming control portion 17, can be executed similarly to the first embodiment, and the same effect in the first embodiment can be exhibited.

(Third Embodiment)

In the aforementioned first and second embodiments, the F instruction is included in the program in the instruction memory, and is composed so that diagnosis of whether processing of F instruction will be executed by FPGA or not is made by detecting such F instructions. Therefore, in a case with programs that do not utilize F instructions, improvement in processing ability based on FPGA cannot be achieved since processing utilizing embedded FPGA cannot be made. Thus, in the present embodiment, program that does not use F instruction is stored in the instruction memory and processing utilizing FPGA is realized, thereby making it possible to achieve improvement in processing ability even in such a case.

Figure 11:
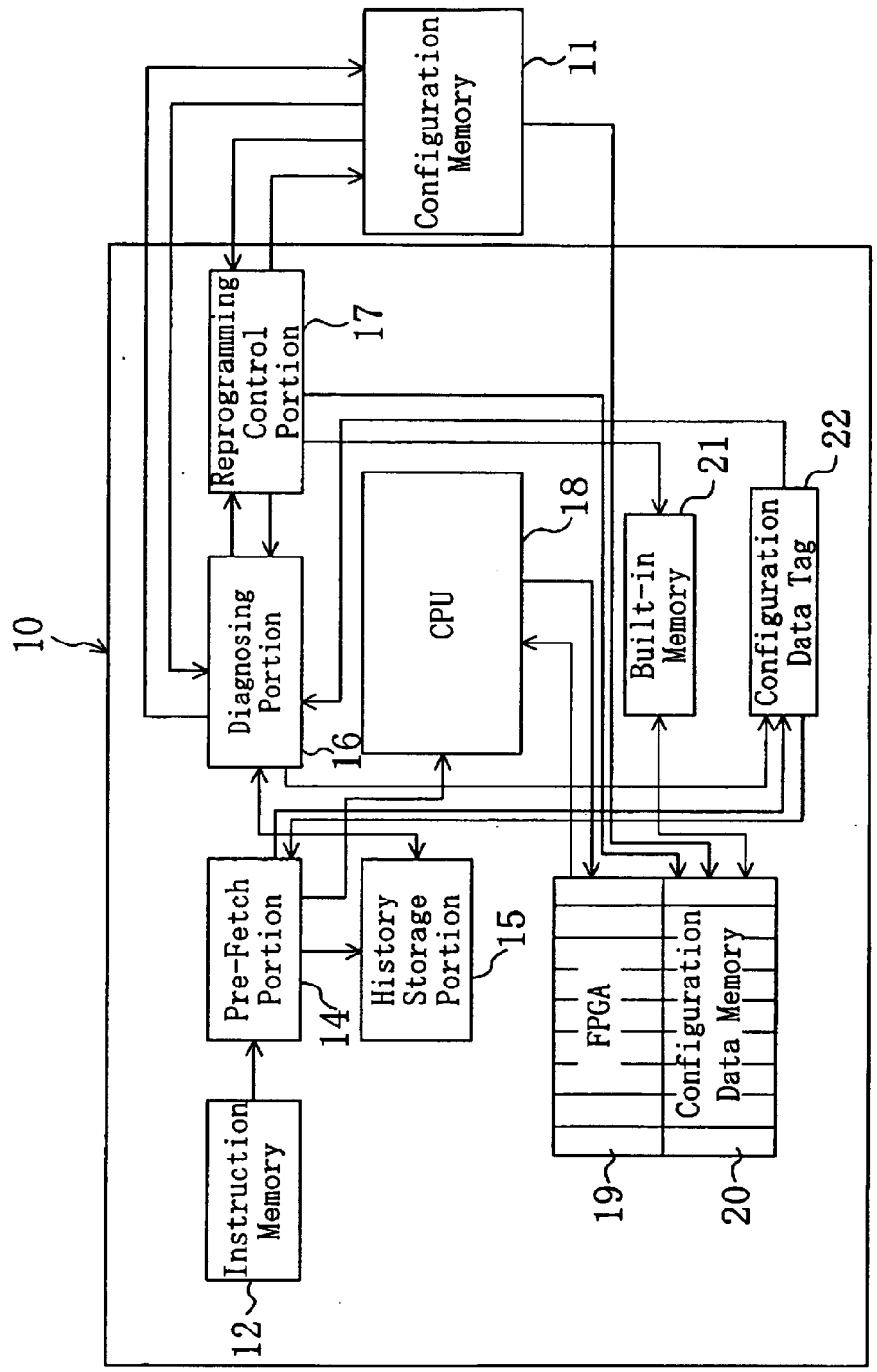
FIG. 11 is a block circuit diagram of a semiconductor integrated circuit in the third embodiment.

FIG. 11 is a block circuit diagram of a semiconductor integrated circuit in the present embodiment. As shown in the drawing, in the present embodiment, no substitute instruction storage portion is provided. In the present embodiment, in the program inside the instruction memory 12, the F instruction is not included. As a processing executed in the embedded FPGA 19, a configuration data of a circuit for executing the equivalent processing to instructions including the instruction other than the F instructions is prepared, and such instructions, configuration data, and ID code are stored in the configuration memory 11 beforehand.

FIG. 8 is a drawing showing an example of the instructions supplied from instruction memory 12 in the present embodiment. In this example, there are three data D1, D2, and D3 stored in the registers. By the instruction of the first row, data D1 and data D2 are added and the sum is substituted into D2. By the instruction of the second row, the value of the data D2 is shifted to the right by the value of D3 and this is substituted into data D2.

FIG. 9 is a drawing showing the data structure of the configuration memory in the present embodiment. As shown in the drawing, the data of the configuration memory includes ID code, instructions, corresponding configuration data, and the number of banks.

FIG. 10 is a drawing showing an example of data structure of configuration memory corresponding to the example of the instructions shown in FIG. 8. Concretely, the ID code is 1, the instructions are "ADD D1, D2.LSR, D3, D2", and the number of banks is 1 corresponding to configuration data (In the drawing, only the items are shown).

The structure of configuration data tag 22 is as explained in the above-mentioned first embodiment.

In the present embodiment, when the pre-fetch portion 14 fetches the instructions from the instruction memory 12, the diagnosing portion diagnoses, referring to the instructions in the configuration memory 11, whether or not instructions corresponding to the fetched instructions exist in the configuration memory 11. In a case where there exist the instructions corresponding to the fetched instructions, the following processing is executed, similar to the case in which F instructions are fetched in the first and second embodiments. In the present embodiment, in a case where instructions corresponding to the instructions fetched from the instruction memory 12 exist in the configuration memory 11 and the instructions have been diagnosed as not being executed by the embedded FPGA 19, then, those instructions are equivalent to the substitution instructions in the first and second embodiments. Furthermore, in the present embodiment, in a case where instructions corresponding to the instructions fetched from the instruction memory 12 exist in the instructions in the configuration memory 11 and the processing has been diagnosed as being execute by the embedded FPGA 19, then, the pre-fetch portion reprograms those instructions shown in FIG. 8 into F instructions shown in FIG. 6A and send them to the CPU 18. Thereby, the processing will be executed by the embedded FPGA 19.

Furthermore, it is also possible to fetch the data of the instructions in the configuration memory 11 to the pre-fetch portion at resetting or power-on resetting. In such a case, since it is not necessary to refer to the configuration memory for the instructions, high speed processing is attained.

Even in the present embodiment, confirmation of the existence of configuration data utilizing the configuration data tag 22, and loading control of configuration data that utilizes the diagnosing portion 16 and reprogramming control portion 17 can be executed in a similar way to the first embodiment.

According to the present embodiment, even for programs that exclude F instructions, processing utilizing the FPGA is possible, and improvement in processing ability can be realized.

(Fourth Embodiment)

Next, an explanation is made on a fourth embodiment in which a function for storing history of a plurality of F instructions, instead of only one F instruction, in the history storage portion 15 shown in FIG. 1 and FIG. 11, is provided.

In the present embodiment, the semiconductor integrated circuits shown in the above-mentioned FIG. 1 and FIG. 11 are used, and an explanation will be given on cases in which the configuration of the history storage portion 15 is different from the above-mentioned first to third embodiments.

Figure 12:
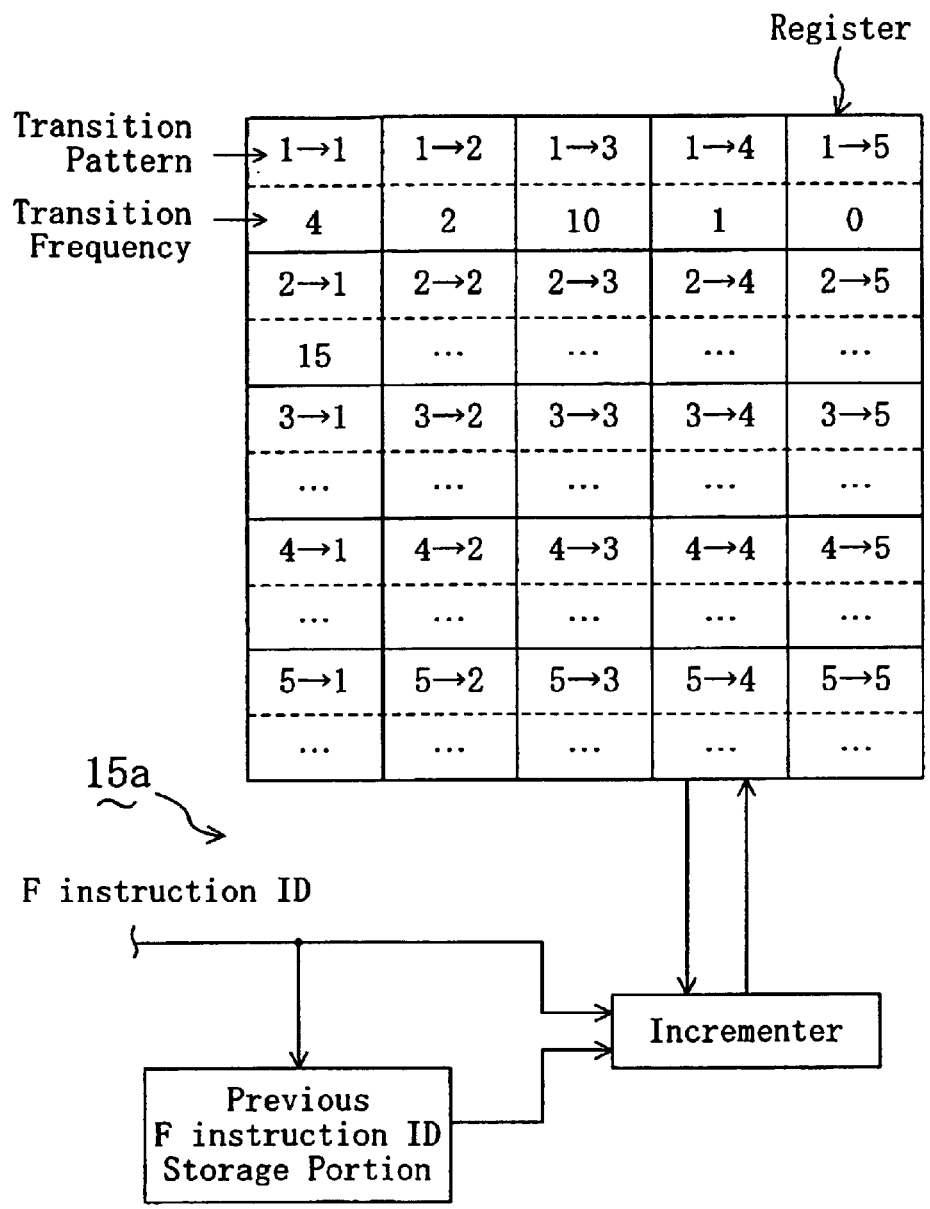
FIG. 12 is a drawing showing a configuration of the main parts of a history storage portion in a fourth embodiment.

FIG. 12 is a drawing showing the configuration of the main parts of the history storage portion in the present embodiment. As shown in the drawing, in the history storage portion 15a, registers whose number is equal to the square of the number of the configuration data, an ID storage portion of the previous F instructions, and an incrementer are installed. In the present embodiment, an example in a case where the number of configuration data is 5 is shown. In the history storage portion 15a, 5×5=25 frequency registers are installed corresponding to a transition pattern from the previous F instruction to the current F instruction, that is, corresponding to transition patterns of ID codes 1, 2, 3, 4, and 5. To the respective frequency registers, the frequencies of respective transition patterns occurred are registered. In FIG. 12, the frequency values are shown as examples for only some of the registers. The registration method of this frequency of the transition pattern is as shown below.

When ID code of F instruction from the pre-fetch portion 14 shown in FIG. 1 and FIG. 11 is input to the history storage portion 15a, the ID code is kept in a previous F instruction ID storage portion during the period until the ID code of the next F instruction is input. When the ID code of the next F instruction is input to the history storage portion 15a, the transition pattern of the ID code between the previous F instruction and the next F instruction is known. Accordingly, the incrementer takes out the present frequency from the frequency register corresponding to the transition pattern, and adds 1 to the frequency value, then the thus added frequency value is returned to the frequency register. The ID code of the next F instruction is kept in the previous F instruction ID storage portion. Thereby, the frequency of each transition pattern is registered to each register while being updated.

On the other hand, the diagnosing portion 16 shown in FIG. 1 and FIG. 11 refers to the frequencies registered in the frequency register in the history storage portion 15a, and determines which configuration data of the F instruction will next be loaded to the configuration data memory 20, based on the ID code of the F instruction being currently executed. For instance, in a case where frequency value illustrated in FIG. 12 is registered in the frequency register, and if the ID code of the F instruction that is being currently executed is 1, configuration data of F instruction of ID code 3 that has the highest transition probability is loaded to the configuration data memory 20 of the embedded FPGA 19 after the F instruction terminates.

Under the control of loading of the composition data of F instruction in the above-mentioned first and second embodiments, the configuration data of the F instructions having the highest input frequencies is stored in the configuration data memory 20 of the embedded FPGA 19 with priority. However, in the present embodiment, the configuration data of the F instruction having the highest transition probability predicted from the current F instructions are stored in the configuration data memory 20 of the embedded FPGA 19 with priority. In other words, in the present embodiment, the loading of the configuration data of the F instruction is controlled by using the occurrence frequency of the transition pattern as an index. Concretely, in the flow chart shown in FIG. 3, F instructions having lower probability of transition in Steps ST24 and ST31 are designated as F instruction B and F instruction C, respectively, and the transition frequencies T are compared in the diagnosis in Steps ST25 and ST32, instead of usage frequencies U.

According to the present embodiment, by loading the configuration data of the F instruction having the highest probability of transition from the current F instruction to the configuration data memory of FPGA beforehand, a situation such as the inevitable use of the substitute instruction due to non-existence of the configuration data of a new F instruction in the configuration data memory of the embedded FPGA 19 when the new F instruction is input can be avoided as much as possible. Thus, in the case with programs where a specific transition patterns is liable to appear, the improvement in processing ability can be anticipated.

Furthermore, in the aforementioned fourth embodiment, an explanation is given on the case in which transition patterns between two F instructions are stored in the history storage portion, but this can also be applied to a case in which transition patterns among three or more F instructions are stored in the history storage portion.

(Fifth Embodiment)

Next, in addition to the above-mentioned fourth embodiment, an explanation will be given on a fifth embodiment which is an example of storing intervals required for the transition of F instructions.

Even in the present embodiment, the semiconductor integrated circuits shown in FIG. 1 and FIG. 11 are used and an explanation will be given for a case in which the configuration of the history storage portion is different from the above-mentioned first through the fourth embodiments.

Figure 13:
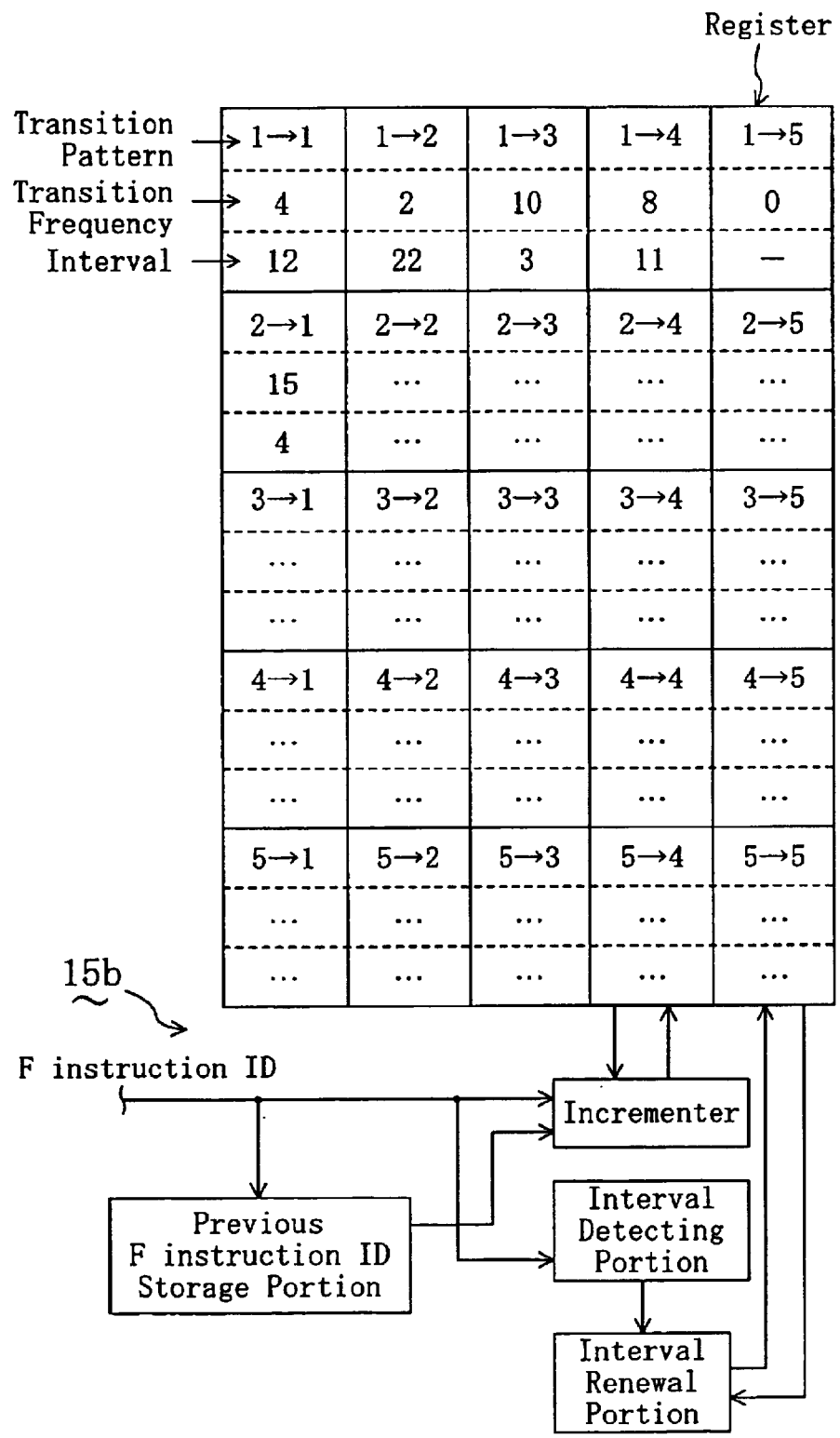
FIG. 13 is a drawing showing a configuration of the main parts of a history storage portion in a fifth embodiment.

FIG. 13 is a drawing that shows the main configuration of the history storage portion in the present embodiment. As shown in FIG. 13, in the history storage portion 15b, registers whose number is twice the square of the number of the configuration data, the previous F instruction ID storage portion, an incrementer, an interval detector (counter), and an interval renewal portion are installed. In the present embodiment, an example in which the number of the configuration data is 5 is adopted. In the history storage portion 15b, registers whose number is 5×5×2=50 are installed corresponding the transition pattern from the previous F instruction to the present F instruction, that is, corresponding to the transition patterns of ID codes 1, 2, 3, 4, and 5. These registers include frequency registers that register the frequency of the transition pattern occurrence and the interval registers that register the average values of the intervals or the time required for the transition. In the drawing, frequency values and average values of intervals for only a part of the registers are illustrated. The registration methods of such transition frequencies and average values of intervals are as shown below.

When the ID of the F instruction is input from the pre-fetch portion 14 to the history storage portion 15b, the occurrence frequencies of the respective transition patterns are registered in the frequency register by the same operation as in the fourth embodiment. Furthermore, the elapsed time since the previous F instruction has been input is counted by the interval detection portion, and the interval from the time the ID code of the previous F instruction is input to the time the ID code of the next F instruction is input are detected. Thus, the average values of the intervals up to the previous interval are taken from the interval register by the interval renewal portion, and the interval average value is renewed based on the following equation:

New Average Value=(Average value up to the previous interval×transition frequency up to the previous transition+Present interval value)/(Transition frequency up to the previous transition+1)

Thereby, in the frequency registers and interval registers, the respective transition pattern frequencies and intervals during the operation of the system are registered while being renewed.

On the other hand, the diagnosing portion 16 shown in FIG. 1 and FIG. 11 refers to the frequencies registered in the frequency register and the average values of intervals registered in the interval register of the history storage portion 15a, and determines which F instruction should be loaded to the FPGA next, based on the ID code of the F instruction that is being currently executed. For instance, supposed that the frequency value and interval values shown in FIG. 13 are registered in the frequency register and present F instruction having ID code of 1 is being executed. In such a case, after the execution of the present F instruction is terminated, F instruction having ID code of 3 has the highest transition probability at present. However, the average value of interval for transition from the F instruction having ID code 1 to F instruction having ID code 3 is only 300 (clock cycles). Since this interval is shorter than the time required for loading (for instance, 500 clock cycles) of configuration data of ID code 3 from the configuration memory to the FPGA, there is no time to reprogram the configuration data. Thus, when referring to the register values of the frequencies and intervals shown in FIG. 13, the transition probability of ID code 1→4 is higher next to ID code 1→3, and the average value of interval for ID Code 1→4 is 1100 (clock cycles). Since this is larger than the loading time (for instance, 500 clock cycles) for the configuration data of ID code 4, there is enough time to execute reprogramming of the configuration data. Therefore, the configuration data of F instruction of ID code 4 is loaded to the configuration data memory 20 of the embedded FPGA 19.

Under the loading control for configuration data of F instruction in the aforementioned first and second embodiments, the configuration data of F instructions having the highest input frequencies is stored in the configuration data memory 20 of the embedded FPGA 19 with priority. However, in the present embodiment, the configuration data of the F instruction that has the highest transition probability predictable from the present F instruction and has time for reprogramming is stored in the configuration data memory 20 of the embedded FPGA 19 with priority. In other words, in the present embodiment, while considering the transition interval, the occurrence frequency of the transition pattern is used as an index, and the loading of the configuration data of the F instruction is controlled. Concretely, in the flow chart shown in FIG. 3, in Steps ST24, ST31, F instructions whose transition probability is low and whose average values of the intervals are longer than the time required for loading are designated as F instruction B and F instruction C, respectively. In the diagnosis in Steps ST25, ST32, the transition frequencies are compared, instead of usage frequencies U, under a condition that the average values of intervals are longer than the time required for loading.

According to the present embodiment, the configuration data of the F instructions having the highest transition probability from the present F instructions are loaded to the configuration data memory of the FPGA beforehand. Thereby, a situation such as the inevitable use of the substitute instruction due to non-existence of the configuration data of the new F instruction in the configuration data memory of the embedded FPGA 19 when new F instructions are input can be avoided as much as possible while considering the intervals. Therefore, improvement in processing abilities can be anticipated.

(Other Embodiments)

Moreover, in the aforementioned first through to fourth embodiments, instruction memory 12 need not be built-in type, but may be exterior type. Furthermore, the pre-fetch portion 14 may be integrated with the CPU 18. The embedded FPGA 19 need not be bank configuration. The built-in memory 21 may be dispensed with. Furthermore, the configuration memory 11 need not be exterior type, but may be built-in type.

Furthermore, in the aforementioned first through third embodiments, in place of usage frequency of F instructions, (usage frequency)×(processing time that has been shortened by processing the F instruction by FPGA) may be used as an index for control of the loading of configuration data. In other words, even if the usage frequency of the F instructions is large, if the improvement in processing ability based on the use of FPGA on the F instruction is low, improvement in processing ability as a whole will less achieved even if the F instruction is used with priority.

According to the present invention, in a semiconductor integrated circuit that has a CPU and an embedded FPGA, circuits composed in the FPGA can be reprogrammed automatically so as to increase the processing ability.

What is claimed is:

1. A semiconductor integrated circuit comprising:
   a CPU;
   an auxiliary operational device for the CPU, the device composed of a programmable device whose circuit configuration is reprogrammable;
   first diagnosing means for receiving one or more instructions and diagnosing whether the one or more instructions is a reserved instruction that can be processed by the auxiliary operational device or not;
   a configuration controller for programming circuit configuration data for executing processing of the reserved instruction into the auxiliary operational device;
   second diagnosing means for diagnosing, upon receipt of a result of the first diagnosing means, whether the circuit for executing processing of the reserved instruction exists in the auxiliary operational device or not in a case where the one or more instructions is the reserved instruction; and
   third diagnosing means for diagnosing, upon receipt of diagnosis results of the first diagnosing means and/or the second diagnosing means, whether the processing of the reserved instruction is executed by using the auxiliary operational device or not in a case where the one or more instructions is the reserved instruction.

2. The semiconductor integrated circuit according to claim 1, wherein the auxiliary operational device has a plurality of banks, and
   the configuration controller programs the configuration data of the reserved instruction if a vacant bank of the auxiliary operational device is larger than a necessary bank of the configuration data of the reserved instruction, and releases, if the vacant bank is smaller than a necessary bank of the configuration data of the reserved instruction, a reserved instruction having a lower usage frequency than the reserved instruction from the auxiliary operational device until the vacant bank becomes larger than the necessary bank of the circuit configuration data of the reserved instruction.

3. The semiconductor integrated circuit according to claim 1, further comprising instruction changeover means for instructing, upon receipt of a diagnosis result of the second diagnosing means, to execute the processing of the reserved instruction by the auxiliary operational device in a case where the circuit for executing the processing of the reserved instruction exists in the auxiliary operational device, and for instructing to execute the processing of the reserved instruction by the CPU in a case where no circuit for executing the processing of the reserved instruction exists in the auxiliary operational device.

4. The semiconductor integrated circuit according to claim 3, wherein
the reserved instruction is an instruction that cannot be executed by the CPU,
the semiconductor integrated circuit further comprises substitute instruction supplying means for supplying a substitute instruction in order to execute a substantially equivalent processing to the reserved instruction by the CPU, and
the instruction changeover means has a function for fetching the substitute instruction from the substitute instruction supplying means.

5. The semiconductor integrated circuit according to claim 3, wherein
the reserved instruction is an instruction that cannot be executed by the CPU,
the semiconductor integrated circuit further comprises instruction supplying means having a function for supplying the one or more instructions and a substitute instruction for executing a substantially equivalent processing to the reserved instruction by the CPU, and
the instruction changeover means has a function for selecting and obtaining the reserved instruction or the substitute instruction from the instruction supplying means.

6. The semiconductor integrated circuit according to claim 3, wherein
the reserved instruction is an instruction that can be executed by the CPU,
the instruction changeover means has a function for changing the instruction so that the processing of the reserved instruction is executed by the auxiliary operational device in a case where the processing of the reserved instruction is executed by the auxiliary operational device, and for not changing the reserved instruction in a case where the processing of the reserved instruction is executed by the CPU.

7. The semiconductor integrated circuit according to claim 1, wherein
the configuration controller has a function for programming, upon receipt of the reserved instruction, circuit configuration data of the reserved instruction into the auxiliary operation device in a case where no circuit for executing the processing of the reserved instruction exists in the auxiliary operation device.

8. The semiconductor integrated circuit according to claim 1, further comprising
history storage means for storing usage frequency of the reserved instruction,
wherein the configuration controller programs, while referring to the history storage means, circuit configuration data for processing the reserved instruction with higher usage frequency into the auxiliary operational device with priority.

9. The semiconductor integrated circuit according to claim 8, further comprising a memory,
wherein the configuration controller programs, while referring to the history storage means, the circuit configuration data of the reserved instruction into the auxiliary operational device and the memory in the order of high usage frequency.

10. The semiconductor integrated circuit according to claim 8, further comprising a memory,
wherein the configuration controller further includes fourth diagnosing means for programming, while referring to the history storage means, the circuit configuration data of the reserved instruction into the auxiliary operational device if an idle capacity is larger than the circuit configuration data of the reserved instruction, and for releasing, if the idle capacity is smaller than the data of the reserved instruction, reserved instruction having lower usage frequency than that of the reserved instruction from the auxiliary operational device until the idle capacity becomes larger than the circuit configuration data of the reserved instruction, and for programming the released reserved instruction into the memory.

11. The semiconductor integrated circuit according to claim 1, further comprising history storage means for storing a transition pattern of the reserved instruction when the one or more instructions includes a plurality of reserved instructions,
wherein the configuration controller programs, while referring to the history storage means, the circuit configuration data of the reserved instruction having a higher probability of transition from a reserved instruction being received at present into the auxiliary operational device with priority.

12. The semiconductor integrated circuit according to claim 1, further comprising history storage means for storing for each reserved instruction a frequency of a second reserved instruction executed next to a first reserved instruction when the one or more instructions includes a plurality of reserved instructions are received,
wherein the configuration controller programs, while referring to the history storage means, the circuit configuration data of the second reserved instruction having a high frequency of being executed next to the first reserved instruction being received at present into the auxiliary operational device with priority.

13. The semiconductor integrated circuit according to claim 1, further comprising history storage means for storing a transition pattern of the reserved instruction in a case where the reserved instruction is received two times, and a time interval at which the two reserved instructions are received,
wherein the configuration controller programs, while referring to the history storage means, the circuit configuration data of the reserved instruction having a higher transition probability from a reserved instruction being received at present into the auxiliary operational device only when the time interval is longer than a time required for programming the circuit configuration data.

14. The semiconductor integrated circuit according to claim 1, further comprising history storage means for storing a transition pattern of the reserved instruction in a case where the reserved instruction is received two times, and a time interval at which the two reserved instructions are received, wherein the configuration controller programs, while referring to the history storage means, the circuit configuration data of a second reserved instruction having a high frequency of being executed next to a first reserved instruction being currently received into the auxiliary operational device only when the time interval is longer than a time required for programming the circuit configuration data.

15. The semiconductor integrated circuit according to claim 1, wherein the configuration controller programs the configuration data of the reserved instruction if an idle capacity of the auxiliary operational device is larger than a capacity of the configuration data of the reserved instruction, and releases, if the idle capacity is smaller than a capacity of the configuration data of the reserved instruction, a reserved instruction having lower usage frequency than the reserved instruction from the auxiliary operational device until the idle capacity becomes larger than the capacity of circuit configuration data of the reserved instruction.

16. A semiconductor integrated circuit comprising:
a CPU;
an auxiliary operational device for the CPU, the device composed of a programmable device whose circuit configuration is reprogrammable;
first diagnosing means for receiving one or more instructions and diagnosing whether the one or more instructions is a reserved instruction that can be processed by the auxiliary operational device or not;
a configuration controller for programming circuit configuration data for executing processing of the reserved instruction into the auxiliary operational device; and
history storage means for storing usage frequency of the reserved instruction,
wherein the configuration controller programs, while referring to the history storage means, circuit configuration data for processing the reserved instruction with higher usage frequency into the auxiliary operational device with priority.

17. The semiconductor integrated circuit according to claim 16, further comprising a memory,
wherein the configuration controller programs, while referring to the history storage means, the circuit configuration data of the reserved instruction into the auxiliary operational device and the memory in the order of high usage frequency.

18. The semiconductor integrated circuit according to claim 16, further comprising a memory,
wherein the configuration controller further includes fourth diagnosing means for programming, while referring to the history storage means, the circuit configuration data of the reserved instruction into the auxiliary operational device if an idle capacity is larger than the circuit configuration data of the reserved instruction, and for releasing, if the idle capacity is smaller than the data of the reserved instruction, reserved instruction having lower usage frequency than that of the reserved instruction from the auxiliary operational device until the idle capacity becomes larger than the circuit configuration data of the reserved instruction, and for programming the released reserved instruction into the memory.

19. A semiconductor integrated circuit comprising:
a CPU;
an auxiliary operational device for the CPU, the device composed of a programmable device whose circuit configuration is reprogrammable;
first diagnosing means for receiving one or more instructions and diagnosing whether the one or more instructions is a reserved instruction that can be processed by the auxiliary operational device or not;
a configuration controller for programming circuit configuration data for executing processing of the reserved instruction into the auxiliary operational device; and
history storage means for storing a transition pattern of the reserved instruction when the one or more instructions includes a plurality of reserved instructions,
wherein the configuration controller programs, while referring to the history storage means, the circuit configuration data of the reserved instruction having a higher probability of transition from a reserved instruction being received at present into the auxiliary operational device with priority.

20. A semiconductor integrated circuit comprising:
a CPU;
an auxiliary operational device for the CPU, the device composed of a programmable device whose circuit configuration is reprogrammable;
first diagnosing means for receiving one or more instructions and diagnosing whether the one or more instructions is a reserved instruction that can be processed by the auxiliary operational device or not;
a configuration controller for programming circuit configuration data for executing processing of the reserved instruction into the auxiliary operational device; and
history storage means for storing for each reserved instruction a frequency of a second reserved instruction executed next to a first reserved instruction when the one or more instructions includes a plurality of reserved instructions are received,
wherein the configuration controller programs, while referring to the history storage means, the circuit configuration data of the second reserved instruction having a high frequency of being executed next to the first reserved instruction being received at present into the auxiliary operational device with priority.

21. A semiconductor integrated circuit comprising:
a CPU;
an auxiliary operational device for the CPU, the device composed of a programmable device whose circuit configuration is reprogrammable;
first diagnosing means for receiving one or more instructions and diagnosing whether the one or more instructions is a reserved instruction that can be processed by the auxiliary operational device or not;
a configuration controller for programming circuit configuration data for executing processing of the reserved instruction into the auxiliary operational device; and
history storage means for storing a transition pattern of the reserved instruction in a case where the reserved instruction is received two times, and a time interval at which the two reserved instructions are received,
wherein the configuration controller programs, while referring to the history storage means, the circuit configuration data of the reserved instruction having a higher transition probability from a reserved instruction being received at present into the auxiliary operational device only when the time interval is longer than a time required for programming the circuit configuration data.

22. A semiconductor integrated circuit comprising:

a CPU;

an auxiliary operational device for the CPU, the device composed of a programmable device whose circuit configuration is reprogrammable;

first diagnosing means for receiving one or more instructions and diagnosing whether the one or more instructions is a reserved instruction that can be processed by the auxiliary operational device or not;

a configuration controller for programming circuit configuration data for executing processing of the reserved instruction into the auxiliary operational device; and history storage means for storing a transition pattern of the reserved instruction in a case where the reserved instruction is received two times, and a time interval at which the two reserved instructions are received, wherein the configuration controller programs, while referring to the history storage means, the circuit configuration data of a second reserved instruction having a high frequency of being executed next to a first reserved instruction being currently received into the auxiliary operational device only when the time interval is longer than a time required for programming the circuit configuration data.

23. A semiconductor integrated circuit comprising:

a CPU;

an auxiliary operational device for the CPU, the device composed of a programmable device whose circuit configuration is reprogrammable;

first diagnosing means for receiving one or more instructions and diagnosing whether the one or more instructions is a reserved instruction that can be processed by the auxiliary operational device or not; and a configuration controller for programming circuit configuration data for executing processing of the reserved instruction into the auxiliary operational device wherein the configuration controller programs the configuration data of the reserved instruction if an idle capacity of the auxiliary operational device is larger than a capacity of the configuration data of the reserved instruction, and releases, if the idle capacity is smaller than a capacity of the configuration data of the reserved instruction, a reserved instruction having lower usage frequency than the reserved instruction from the auxiliary operational device until the idle capacity becomes larger than the capacity of circuit configuration data of the reserved instruction.

24. A semiconductor integrated circuit comprising:

a CPU;

an auxiliary operational device for the CPU, the device composed of a programmable device whose circuit configuration is reprogrammable;

first diagnosing means for receiving one or more instructions and diagnosing whether the one or more instructions is a reserved instruction that can be processed by the auxiliary operational device or not; and a configuration controller for programming circuit configuration data for executing processing of the reserved instruction into the auxiliary operational device, wherein the auxiliary operational device has a plurality of banks, and the configuration controller programs the configuration data of the reserved instruction if a vacant bank of the auxiliary operational device is larger than a necessary bank of the configuration data of the reserved instruction, and releases, if the vacant bank is smaller than a necessary bank of the configuration data of the reserved instruction, a reserved instruction having a lower usage frequency than the reserved instruction from the auxiliary operational device until the vacant bank becomes larger than the necessary bank of the circuit configuration data of the reserved instruction.

* * * * *